United States Patent [19]
Attali et al.

[11] 3,753,294
[45] Aug. 21, 1973

[54] METHOD AND APPARATUS FOR MEASURING DEPTH

[75] Inventors: Georges Attali; John Aitken, both of Paris, France; Jean-Louis Bernard, Houston, Tex.

[73] Assignee: Schlumberger Technology Corporation, New York, N.Y.

[22] Filed: Feb. 24, 1971

[21] Appl. No.: 118,263

[30] Foreign Application Priority Data
Feb. 27, 1970 France .............................. 7007104

[52] U.S. Cl. ................................................ 33/133
[51] Int. Cl. ........ G01b 7/04, G01b 7/26, G01b 5/18
[58] Field of Search ...................... 33/141.5; 73/151

[56] References Cited
UNITED STATES PATENTS
3,465,448  9/1969  Whitfill ................................ 33/133
3,027,649  4/1962  Sloan ................................... 33/129

Primary Examiner—Harry N. Haroian
Attorney—William R. Sherman, Stewart F. Moore, Jerry M. Presson and Edward M. Roney

[57] ABSTRACT

In accordance with illustrative embodiments of the present invention, the distributed capacitance between a conductor and the outer metallic armor of a cable is measured to enable a determination of the instantaneous changes in position of a tool supported by an elastic cable in a borehole. The correction calculated from the capacitance measurement is used to correct cable length measurements derived from a measure wheel which engages and rotates with movement of the cable.

12 Claims, 6 Drawing Figures

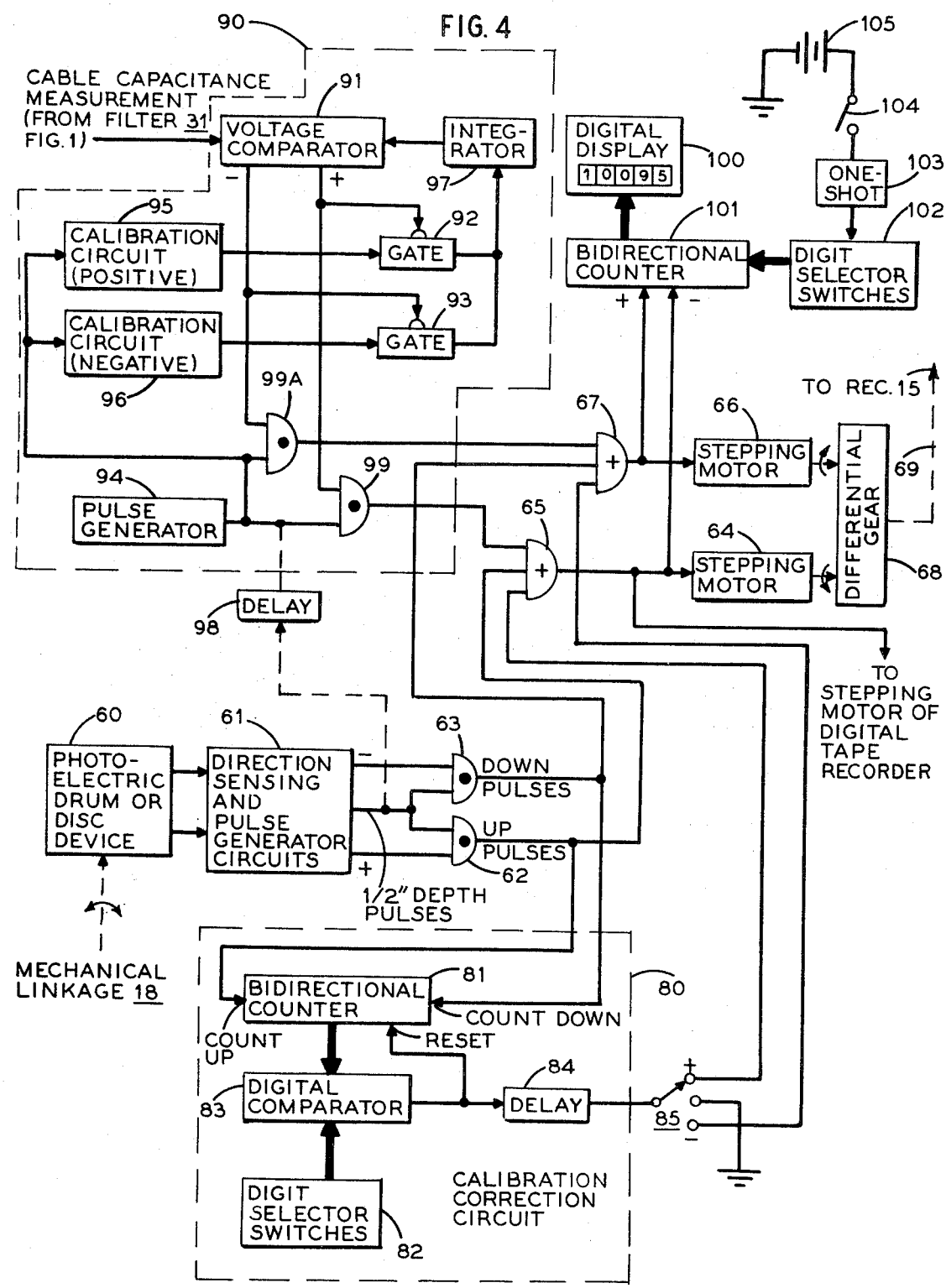

METHOD AND APPARATUS FOR MEASURING DEPTH

This invention relates to methods and apparatus for continuously determining the depth of a device suspended at the end of a cable in a borehole.

In borehole logging, parameters measured by a well tool suspended at the end of a cable in a borehole are recorded as a function of the depth of the downhole investigating tool. The cable is reeled in and out of the borehole by a drum and winch mechanism. The depth of this tool must be known for the measurement to have any meaning. This depth must be known with precision when two or more successive measurements are combined in order to calculate a quantity which is not directly measurable.

One way of determining the depth of a well tool is to position a measure wheel, whose diameter is known, to be driven tangentially by the cable to provide a measure of total cable length. This measure wheel derived cable length will be called "average cable length" hereafter. Unfortunately, there are factors which cause this average length to be erroneous when a tool is supported by a cable in a borehole. For example, slipping can occur between the cable and the wheel. Furthermore, due to such things as the wear of the wheel or temperature, the diameter of the measure wheel does not always remain constant, i.e., there is a difference between the assumed diameter of the wheel and its real diameter. A second error comes from variations in length of the cable due to the high temperatures in the borehole. A third error arises from cable elongation due to the normal cable tension caused by the weight of the cable and well tool. These first three errors are proportional to the total cable length and corrections therefor can be referred to as "proportional cable length corrections." A fourth error comes from the elastic cable length changes under the action of sudden or random forces to which the cable or tool can be subjected. For example, sudden changes by the cable reeling mechanism or friction caused by the cable or well tool rubbing against the borehole wall can cause this fourth type of error.

In making depth measurements, the changes in average cable length given by a measure wheel, after correction for proportional cable length changes, will be relatively accurate provided the distribution of tension along the cable is uniform, i.e., the tension gradient along the cable is constant. This would be the case if, for example, a cable suspended in a perfectly vertical borehole of large diameter were reeled in at a slow, constant speed without the cable or downhole tool contacting the borehole wall. Unfortunately, the forces of friction, especially on the downhole well tool, can undergo large variations, especially in slanted boreholes or boreholes with rugose walls. These variations of the forces of friction cause the well tool to undergo vertical oscillations, also called "yo—yo movements," which, appearing in a random manner, render the determination of cable length very difficult.

Several methods have been proposed for correcting these various errors. Since the first three errors are proportional to the length of cable lowered into the borehole, they can be corrected in a relatively simple manner through the use of correction charts or pre-established relations. The correction of the fourth error is more complex. In U.S. Pat. No. 3,497,958 granted to L. H. Gollwitzer on Mar. 3, 1970 the correction for these random or erratic cable length changes as well as proportional elastic elongation is calculated by using measurements of the tension in the cable at the surface and at the well tool. This correction is substantially precise, but it necessitates the addition of a tensiometer to the downhole well tool and the use of relatively complex computers for computing the correction. Another way to correct for the erratic cable length changes is to use measurements of the acceleration of the cable at the surface of the earth and at the well tool for correction purposes, as shown in U.S. Pat. No. 3,490,149 granted to W. E. Bowers on Jan. 20, 1970. Again, measuring devices would be necessary downhole with the Bowers system.

It is an object of the invention, therefore, to provide new and improved methods and apparatus for providing accurate representations of the depth of a well tool in a well bore.

It is a further and more particular object of the invention to accomplish the above object with measuring apparatus located only at the surface of the earth.

In accordance with the present invention, the position or changes in position of a tool supported by a cable in a borehole are determined by deriving a plurality of measurements and combining them. More specifically, measurements representative of the movement of a cable at the surface of the earth and measurements representative of an electrical parameter of a cable are derived. These derived measurements are then combined to produce representations of the position or changes in position of a well tool in a borehole. After a great deal of experimentation, it has been found that the distributed capacitance between a conductor and the outer metallic armor of a cable is proportional to cable stretch. Thus, corrections computed from this capacitance measurement can be used to correct the cable movement measurements.

For a better understanding of the present invention, together with other and further objects thereof, reference is had to the following description taken in connection with the accompanying drawings, the scope of the invention being pointed out in the appended claims.

Referring to the drawings.

Figure 2:
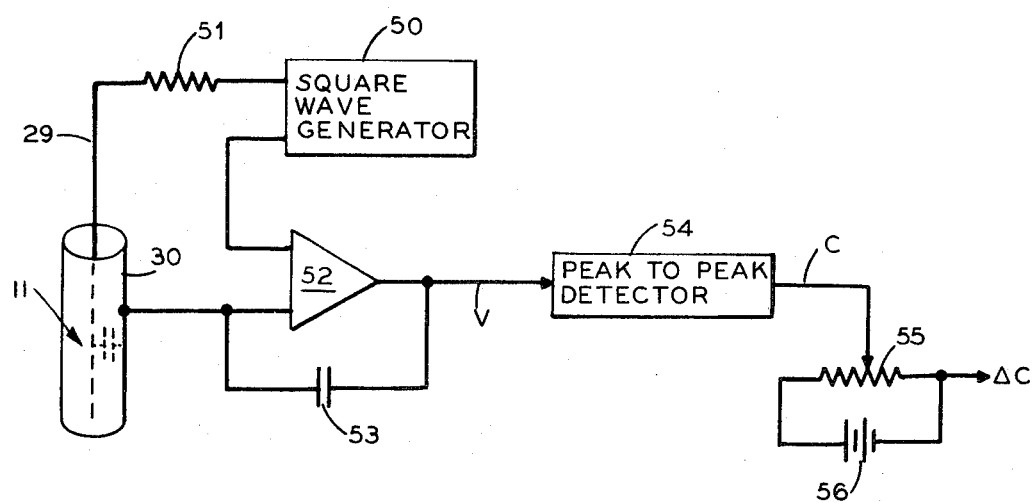
FIG. 2 is a schematic diagram of an analog circuit for measuring cable elongation, used in the apparatus of FIG. 1.
Figure 3A:
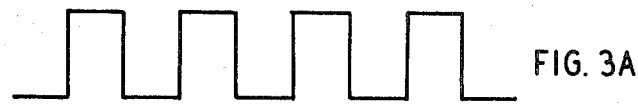
Figure 3B:
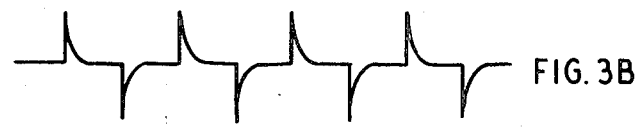
Figure 3C:

FIGS. 3A-3C comprises a waveform representation of the signals taken at various points in the circuit of FIG. 2; and FIG. 4 is the schematic diagram of a digital circuit for providing accurate depth indications according to the invention.

Figure 1:
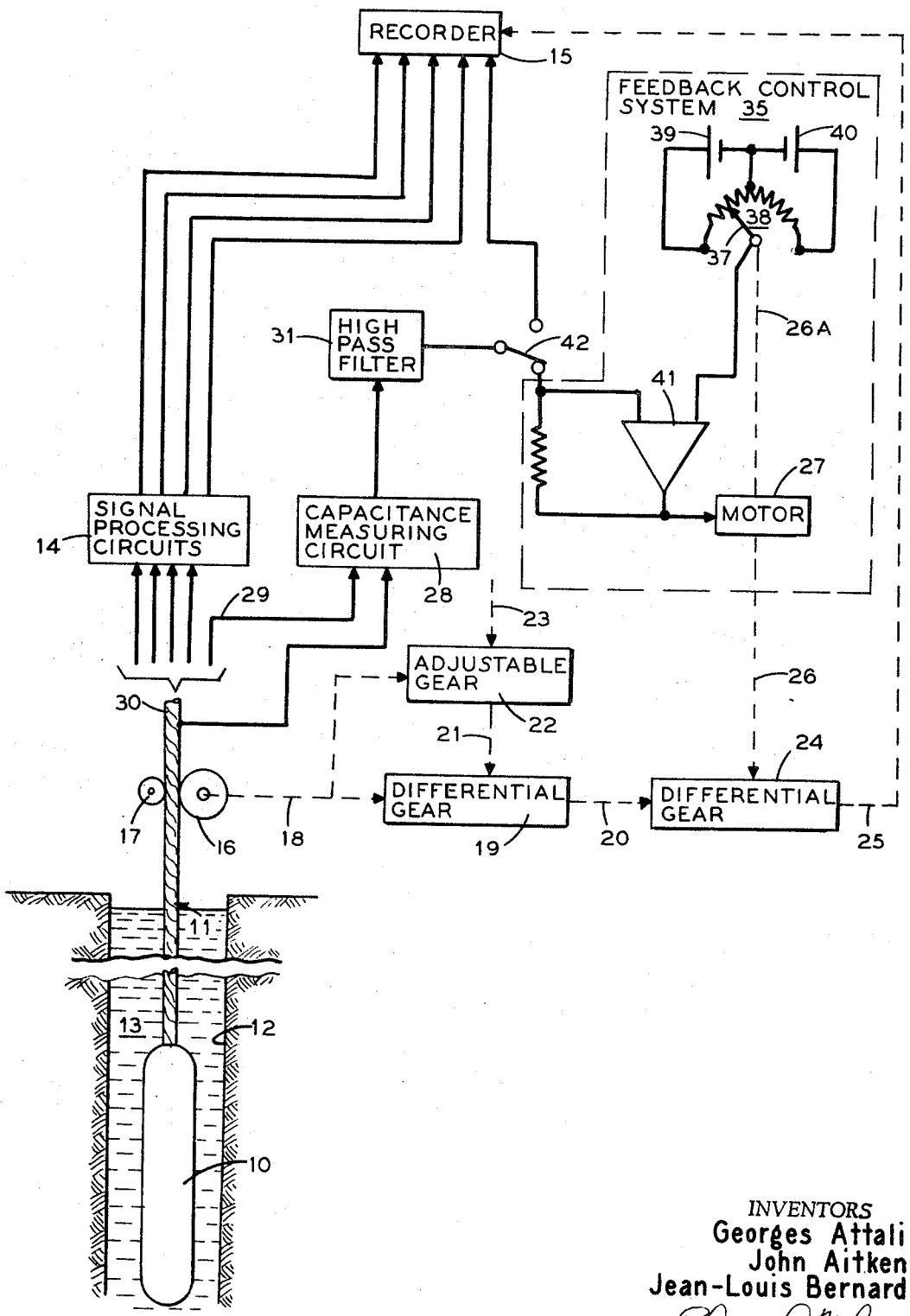
FIG. 1 is a schematic diagram of apparatus for measuring depth of a tool in a borehole according to the present invention.

With reference to FIG. 1, a well tool 10 is suspended at the end of an armored cable 11 in a borehole 12 filled with drilling mud 13. The cable contains one or more insulated conductors and is reeled in and out at the surface by a drum winch mechanism (not shown) which permits the tool 10 to be moved through the borehole. The tool 10 can be a measuring device which gives electrical signals which are representative of certain parameters of the formations surrounding this tool 10. These signals are processed by suitable signal processing circuits 14 and recorded on a suitable record medium such as photographic film or magnetic tape as a function of depth by a recorder 15 at the surface of the earth. The record medium of the recorder 15 is driven by the movement of the cable by means of an apparatus which will be described later on.

A measure wheel 16 is maintained in contact with the cable 11 by a back-up wheel 17 so that the rotation of this wheel 16 is proportional to the length of cable unreeled. The measure wheel 16 drives a mechanical linkage 18. The end of the linkage 18 is connected to the input of a mechanical differential gearing arrangement 19 whose output is a mechanical linkage 20. The movement of the linkage 20 is identical to that of the linkage 18 as long as a third mechanical linkage 21 or control shaft remains stationary. To drive linkage 21, the linkage 18 drives an adjustable gearing arrangement 22 whose gear ratio is established by a control 23. The adjustable gear device 22 permits a calibration correction proportional to the rate of cable movement to be introduced into the rotation of the linkage 20. The control 23 is chosen such that this correction takes into account the true diameter of the measure wheel 16, the pressure of this wheel on the cable 11, the average tension applied to the cable and all other parameters which introduce proportional errors between the rotation of the shaft 18 and the length of cable actually being reeled in. The linkage 20 is connected to the input of a second differential gear 24 whose output linkage 25 drives the recorder 15. The differential 24, analogous to the first differential 19, includes control linkage 26 driven by an electrical motor 27.

The apparatus of FIG. 1 described thus far does not account for erratic changes in cable length. To this end, in accordance with the present invention, it has been found after a great deal of experimentation that the variations of the capacitance between a conductor and the armor of the cable are substantially proportional to the elongation of the cable ($\Delta C = k\ \Delta L$) at constant temperature. These experiments showed that the coefficient of proportionality increased slightly when the total tension applied to the cable increases. On the other hand, this coefficient of proportionality decreases when the temperature decreases. In the case of a cable suspended in a borehole, as the lower portion of the cable is at a higher temperature and a lower tension than the upper portion, these two effects subtract from one another, leading to better linearity of the function which relates the variations of distributed capacitance, even if it is not absolutely precise in terms of its relation to total cable length and, has the great advantage of offering excellent resolution in terms of changes in cable length. By eliminating the slow variations due to the effects of temperature, pressure, tension due to the weight of cable and tool, ageing of the cable, and others, a good indication of the erratic movements of the downhole device can thus be obtained.

To accomplish the above, a capacitance measuring circuit 28, connected between an insulated conductor 29 and the armor 30 of the cable 11, gives an output signal proportional to the variations of the capacitance, distributed along the cable, existing between this conductor and the armor. This circuit 28 will be described in more detail later on. By eliminating, by means of a high pass filter 31, the very slow variations of $\Delta C$, due to changes in temperature for example, a signal will be obtained which is representative of rapid changes in stretch of the cable coming from vertical oscillations of the well tool 10.

The output signal from the filter 31 is connected to a feedback control system 35 which controls the position of the motor 27 output shaft. In this system, the shaft of the motor 27 is connected mechanically to the wiper arm 37 of a potentiometer 38 supplied with current from sources 39 and 40. The potential picked up by the wiper arm 37 is thus proportional to the amount of rotation of the shaft 26 of motor 27. The wiper arm 37 is connected to the input of a differential amplifier 41 of high gain whose other input is connected to the output of the filter 31 through a double pole switch 42. The output from amplifier 41 energizes the motor 27 until it has rotated an amount proportional to the output signal from the filter 31. At this time, the voltage on wiper arm 37 will equal that from filter 31 thus causing the output from amplifier 41 to go to zero and the motor 27 shaft to stop turning. By this means, the motor 27 will introduce a correction by way of gear 24 to the rotation of shaft 25 in dependence on the changes in capacitance as measured by circuit 28. Thus, the rotation of linkage 25 will be proportional to the movement of well tool 10.

The other terminal of the switch 42 is connected to one channel of the recorder 15. By changing the position of the switch, the output signal from the filter 31 is recorded on a photographic film or magnetic tape along with the measurements derived from the well tool. In this case, the cable capacitance measurements could be later used to depth correct the other measurements, e.g., by means of a computer program.

FIG. 2 shows in more detail an embodiment of the capacitance-measuring circuit 28. Such a circuit comprises a voltage generator 50 producing a square signal applied via a resistor 51 to the conductor 29 of the cable 11. The metallic armor 30 of the cable 11 is connected to one input of an integrating amplifier 52 comprising a capacitor 53 mounted in a negative feedback loop. The other input of the amplifier 52 is connected to the generator 50. The amplifier 52 gives an output signal V which is applied to a peak-to-peak detector 54 to give an output signal C proportional to the peak amplitude of the signal V. The output C of the detector 54 is connected to the wiper arm of a potentiometer 55 supplied by a constant voltage source 56. This potentiometer permits the subtraction from the signal C of a constant value so as to retain only the variations of this signal. This constant value can be set by appropriate placement of the wiper arm.

With reference to FIGS. 3A–3C, the generator 50 produces a square signal as shown in FIG. 3A. The current flowing in the resistor 51 will charge the capacitor formed by the conductor 29 and the armor of the cable 11 and will have the form shown in FIG. 3B (differentiation of the signal of FIG. 3A). By integrating this current in the capacitor 53, a signal V is obtained, as shown in FIG. 3C, whose peak voltage is directly proportional to the distributed capacitance formed by the cable. So that this will always be true, the frequency of the square signals furnished by the generator 50 is desirably chosen such that the extreme amplitudes of the output signals from the integrator 52–53 are always plateaus, i.e., so that the integrator capacitor 53 will have sufficient time to charge to the maximum level each half cycle of the FIG. 3A square wave. The output signal from the detector 54 will be a DC voltage proportional to this peak voltage.

In the embodiment of FIG. 2, mechanical means have been used for introducing the various corrections of the measurement of length given by the wheel 15. Other systems, of the electronic type, can be envisaged. One will be illustrated next.

FIG. 4 shows an electronic system for introducing corrections while taking a minimum amount of energy from the shaft 18. This shaft 18 is connected to a photoelectric drum or disc device 60 which produces two pulse trains phase-shifted one with respect to the other by a quarter of a period. A quarter period may correspond, for example, to a linear displacement of one-half inch of cable travel. The two series of pulses from the device 60 are supplied to direction sensing and pulse generating circuits 61 which produces an output signal on one of the "+" or "−" outputs depending on whether the cable is moving up or down at the measure wheel 16. The circuits 61 also produces one-half inch incremental depth pulses, one pulse for each one-half inch of cable travel as given by measure wheel 16. Examples of elements 60 and 61 can be found in the above-mentioned Gollwitzer patent or in copending application, Ser. No. 739,330 filed on June 24, 1968 by F. D. Hurlston.

An AND gate 62 is responsive to the one-half inch pulses and "+" (up direction) output of circuits 61 to produce one-half inch pulses only when the cable is moving up and an AND gate 63 is responsive to the one-half inch pulses and "−" (down direction) outputs of circuits 61 for producing one-half inch pulses only when the cable is moving down. The "up pulses" from AND gate 62 are supplied to a stepping motor 64 via an OR gate 65 and the "down pulses" from AND gate 63 are supplied to a stepping motor 66 via an OR gate 67. The output shafts from the stepping motors rotate in opposite directions and are combined in a differential gear 68. The output shaft 69 from gear 68 drives the record medium of the recorder 15 (see FIG. 1). It can be seen that the shaft 69, as driven by only the pulses from AND gates 62 and 63, will rotate proportionally to the rotation of measure wheel 16 and linkage 18.

To provide the proportional cable length correction is the function of a calibration correction circuit 80. This circuit operates to generate one correction pulse each time a selected number of one-half inch pulses has been generated by circuits 61. To this end, the "up pulses" from AND gate 62 cause a bidirectional counter 81 to count up and the "down pulses" from AND gate 63 cause the counter to count down. A plurality of "digit selector switches" 82 are set to generate a plurality of output signals representative of a preselected number. A digital comparator 83 compares the number contained in counter 81 with the preselected number set by switches 82 and generates an output pulse whenever the two numbers are equal. This output pulse resets the counter 81 and after a suitable delay provided by a delay circuit 84, is applied via a 3-position switch 85 to one of the OR gates 65 or 67. This delay prevents interference between the calibration correction pulses and the measure wheel pulses.

In operation, the digit selector switches 82 are set in accordance with a pre-established proportional calibration correction. The switch 85 determines the polarity of the correction with the center grounded terminal corresponding to no correction. The "+" position of switch 85 is connected to OR gate 65 along with the output from AND gate 62 and the "−" position of switch 85 is connected to OR gate 67 along with the output from AND gate 63. Taking an example of how proportional calibration is obtained, if a +0.005 inch/inch calibration correction is necessary, the selector switches would be set to "100" and switch 85 would be set to "+." Since each count by counter 81 corresponds to 0.5 inches, 1 pulse added to every 100 pulses applied to OR gate 65 from AND gate 62 will give the desired correction. In this example, the bidirectional counter 81 would count 100 of the one-half inch pulses before comparator 83 would generate a correction pulse for application to OR gate 65. The generated pulse would reset counter 81 to start the operation again.

To provide corrections for erratic cable length changes, a circuit 90 uses the cable capacitance measurements from high pass filter 31 of FIG. 1 to generate correction pulses for application to the OR gates 65 and 67.

To accomplish this, the filtered cable capacitance measurements are applied to one input of a voltage comparator 91, the other input thereto coming from a source to be described later. If the filtered cable capacitance measurement amplitude is greater than the voltage level of the other input to comparator 91, a signal is produced on the "−" output therefrom. If the opposite is true, a signal will be produced on the "+" output and if the two inputs are within a predetermined range of one another, neither output is active. Comparators which perform the above functions are readily available.

The "−" and "+" outputs of comparators 91 enable a pair of analog signal gates 92 and 93 respectively. A pulse generator 94, operating at a frequency approximating that of the maximum frequency of the one-half inch pulses, supplies pulses via a pair of calibration circuits 95 and 96 to the gates 92 and 93 respectively. The calibration circuit 95 produces positive pulses when energized and circuit 96 supplies negative pulses. The energy content of these positive pulses equals that of the negative pulses. The gated positive and negative pulses charge and discharge an integrator 97 whose output comprises the other input to comparator 91.

The circuit 90 is a self-balancing feedback circuit which operates to maintain equality between both inputs to the comparator 91. Whenever the capacitance measurement exceeds the integrator 97 output, a voltage appears on the "−" output of comparator 91 to enable gate 92 thereby causing positive pulses from circuit 95 to charge the capacitor within integrator 97. This continues until equality is re-established. If the capacitance measurement should decrease thus upsetting the equality condition, the "+" output of comparator 91 would enable gate 93 to cause a sufficient number of negative pulses to be applied to integrator 97 to re-establish the equality condition.

Each time a positive pulse is applied to integrator 97, an AND gate 99, which responds to the coincidence of the "+" output of comparator 91 and a pulse from pulse generator 94, applies a pulse to the OR gate 65 to be added to the pulse train from AND gate 62. In like fashion, each time a negative pulse is applied to integrator 97, an AND gate 99A supplies a pulse to the OR gate 67 to be added to the pulse train from AND gate 63.

Taking an example of how the system of FIG. 4 operates, assume that the well tool is being raised through the borehole. For each one-half inch of cable travel past the measure wheel 16, an "up pulse" will be applied to stepping motor 64 to cause the output shaft from gear 68 to reflect this one-half inch decrease in total cable length. The calibration correction circuit 80 will generate a one-half inch pulse at intervals determined by the selector switches 82 and of a polarity determined by switch 85. While moving up, if an increase in capacitance should occur thus indicating an increase in cable stretch, the circuit 90 will generate the necessary number of pulses through AND gate 99A to rebalance the correction circuit 90. These pulses will be applied to stepping motor 66 to cause the output shaft from gear 68 to turn in the opposite direction than was the case for the one-half inch "up pulses." It should be pointed out here that the "up pulses" reflect decreases in total cable length while pulses from the correction circuit 90 after an increase in capacitance reflect increases in total cable length.

In the correction circuit 90 of FIG. 4, the correction pulses originate from a non-synchronous oscillator 94 which may cause conflicts between these pulses and the one-half inch and calibration pulses from circuits 61 and 80. To provide synchronization of the entire system, the pulse generator 94 could be eliminated and a delayed version of the one-half inch pulses from circuits 61 could be used instead. A dotted line connection via a delay circuit 98 illustrates this modification. The delay provided by delay circuit 98 would be different from that provided by delay circuit 84 to prevent interference.

If desired, a digital display of depth could be provided, as illustrated by the digital display device 100 in FIG. 4. To drive this display device, a bidirectional counter 101 would count up in response to the down direction pulses from OR gate 67 and would count down in response to the up direction pulses from OR gate 65. To set the initial depth number in counter 101, a plurality of digit selector switches 102 are set to indicate the starting or initial depth. A switch 104 is closed to energize a one-shot 103 which in turn energizes the switches 102.

Instead of driving the recorder 15 of FIG. 1 with the output shaft from gear 68, the up direction pulses from OR gate 65 could be applied to a stepping type digital tape recorder of the type shown in U.S. Pat. No. 3,457,544 granted to G. K. Miller et al. on July 22, 1969.

There are many modifications to the embodiments illustrated herein which would be obvious to those skilled in the art. For example, one or both of the corrections (proportional calibration or erratic cable length changes) could be recorded for subsequent processing. Moreover, for cables of the type in which the variations $\Delta C$ of capacitance would be exactly proportional to the elongation $\Delta L$ of the cable, it would be possible to eliminate the high pass filter 31. In this case, the number set in the selector switches 82 would reflect only the calibration for the measure wheel 16.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of determining the position or changes in position of a tool supported in a borehole by a cable having an electrical parameter which varies in proportion to changes in length of the cable, comprising:
   a. deriving measurements representative of the movement of the cable at the surface of the earth;
   b. deriving measurements representative of said electrical parameter of the cable; and
   c. combining said derived measurements to produce representations of the position or changes in position of the tool in the borehole.

2. The method of claim 1 wherein the cable has an inner conductor and an outer metallic armor and the step of deriving measurements of said electrical parameter includes measuring an electrical parameter between the outer metallic armor and the conductor to produce such measurements.

3. The method of claim 1 wherein the step of combining includes the steps of filtering out the low frequency components of said electrical parameter measurements to retain the high frequency components thereof, and combining the high frequency components of said parameter measurements with said cable movement measurements to produce said representations of the position or changes in position of a tool.

4. A method of determining the position or changes in position of a tool supported in a borehole by a cable having an inner conductor and an outer metallic armor, comprising:
   a. deriving measurements representative of the movement of the cable at the surface of the earth;
   b. deriving measurements representative of the distributed capacitance between the conductor and the outer metallic armor of the cable; and
   c. combining said derived measurements to produce representations of the position or changes in position of the tool in the borehole.

5. The method of claim 4 wherein the step of combining includes the steps of filtering out the low frequency components of said capacitance measurements to retain the high frequency components thereof, and combining the high frequency components of said capacitance measurements with said cable movement measurements to produce said representations of the position or changes in position of a tool.

6. The method of claim 4 and further including the step of producing representations of a proportionality or calibration correction to said cable movement measurements, and wherein the step of combining includes the steps of combining said derived measurements with said correction representations to produce said representations of tool position or changes in position.

7. Apparatus for determining the position or changes in position of a tool supported in a borehole by a cable having an electrical parameter which varies in proportion to changes in length of the cable, comprising:
   a. cable measuring means adapted for engaging the cable for producing a first signal representative of the amount of cable passing said cable measuring means;

b. means adapted for measuring said electrical parameter of the cable and producing a second signal representative thereof; and c. means adapted for combining said first and second signals to produce an output signal representative of the position or changes in position of the tool.

8. Apparatus for determining the position or changes in position of a tool supported in a borehole by a cable having an inner conductor and an outer metallic armor, comprising:

a. cable measuring means adapted for engaging the cable for producing a first signal representative of the amount of cable passing said cable measuring means;

b. means adapted for measuring the distributed capacitance between the conductor and the outer metallic armor of said cable and producing a second signal representative thereof; and c. means adapted for combining said first and second signals to produce an output signal representative of the position or changes in position of the tool.

9. The apparatus of claim 8 wherein said means adapted for combining includes means for filtering out the low frequency components of said second signal to leave the high frequency components thereof, and means for combining the high frequency components of said second signal with said first signal to produce said output signal.

10. The apparatus of claim 8 and further including means responsive to said first signal for producing a third signal representative of a proportional correction to be applied to said first signal, and wherein said means adapted for combining comprises means adapted for combining said first, second and third signals to produce said output signal.

11. The apparatus of claim 10 wherein said first, second and third signals are rotations of mechanical linkages and said combining means includes differential gearing means having an output mechanical linkage and means responsive to said first, second and third signals for causing said output linkage to rotate as a function of the changes in position of a tool in a borehole.

12. The apparatus of claim 10 wherein said first, second and third signals are electrical pulses and said means adapted for combining includes logic means responsive to said pulses for producing a first series of pulses representative of increases in total cable length and a second series of pulses representative of decreases in total cable length, and accumulating means for adding one of said series of pulses and subtracting the other series to produce representations of the position of a tool in a borehole.

* * * * *

UNITED STATES PATENT OFFICE
CERTIFICATE OF CORRECTION

Patent No. 3,753,294           Dated August 21, 1973

Inventor(s) Georges Attali et al.

It is certified that error appears in the above-identified patent and that said Letters Patent are hereby corrected as shown below:

Column 3, line 8, "proportional to the length" should read --proportional to the changes in length--;

line 40, "increased" should be --increases--;

Column 6, line 29, the negative symbol (-) should be a positive symbol (+);

line 30, the positive symbol (+) should be a negative symbol (-);

line 52, the negative symbol (-) should be a positive symbol (+);

line 57, the positive symbol (+) should be a negative symbol (-);

Column 7, line 15, "to" should be --and--.

Signed and sealed this 29th day of October 1974.

(SEAL)
Attest:

McCOY M. GIBSON JR.           C. MARSHALL DANN
Attesting Officer             Commissioner of Patents